3,251,768
DRILLING MUDS AND SIMILAR FLUIDS
Richard E. Walker, Tulsa, Okla., assignor, by mesne assignments, to Esso Production Research Company, Houston, Tex., a corporation of Delaware
Filed July 18, 1962, Ser. No. 210,766
7 Claims. (Cl. 252—8.5)

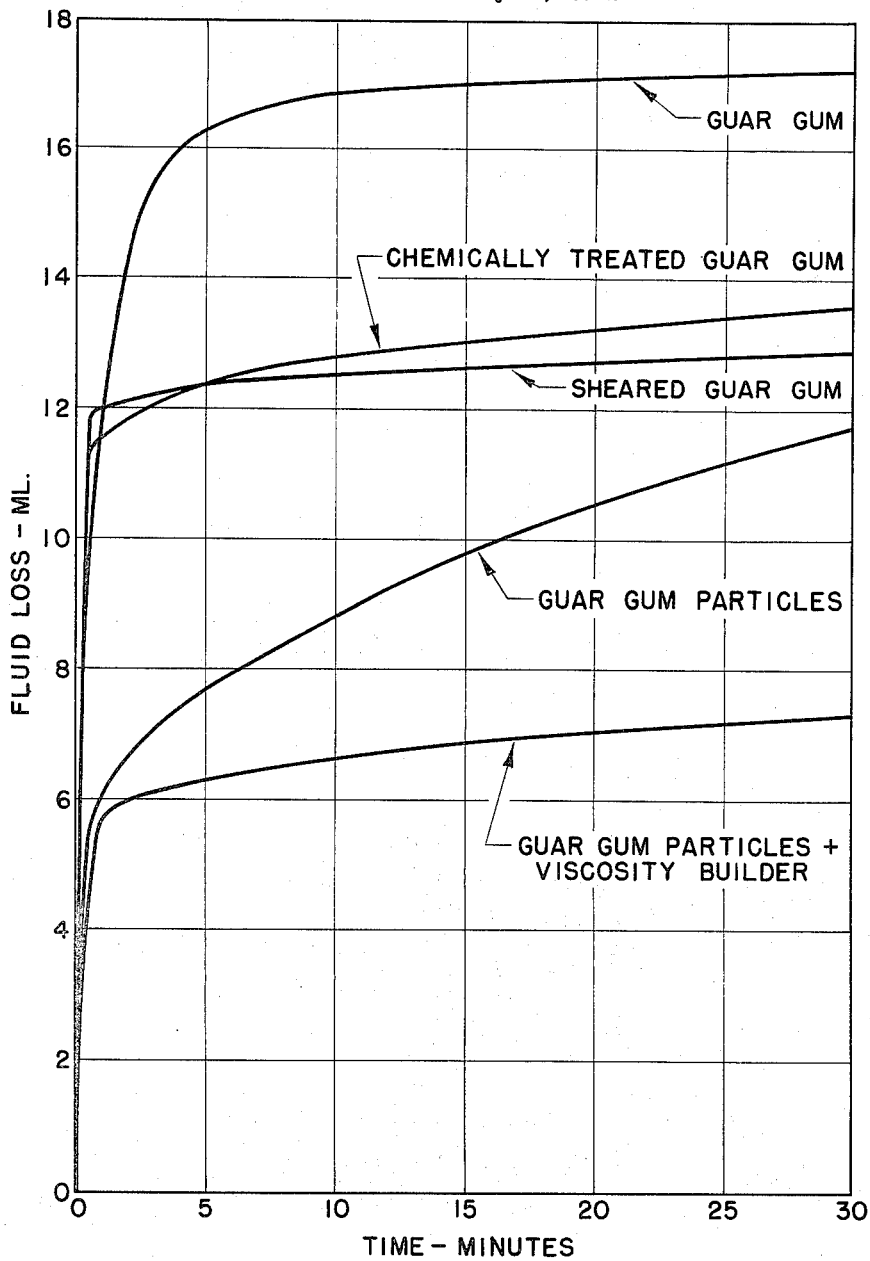

The present invention relates to fluids useful in the drilling, completion, and workover of oil wells, gas wells, and similar boreholes and is particularly concerned with improved drilling muds and similar fluids which have better fluid loss control properties than compositions employed in the past.

A variety of gums, resins, polymers and related materials have been proposed for use as fluid loss control agents in oil field drilling, completion and workover fluids. The gums suggested include guar gum a crude polysaccharide derived from the seeds of the guar plant, *Cyamopsis tetragonolobus*. This material is generally marketed as a dry powder containing about 75 percent by weight of a D-galacto-D-mannoglycan and about 25 percent by weight of ash, protein, fat, fiber and moisture. The glycan is a straight chain mannan having single membered galactose branches and is thus classified as a galactomannan. The D-mannopyranose units in the chain are joined to one another by beta-1,4 linkages. The D-galactopyranose units are generally attached to every other D-mannopyranose unit through alpha-1,6 linkages. The gum readily hydrates in water and normally has a molecular weight of about 220,000. Tests have shown that it will readily plug porous subsurface strata. Other galactomannan gums having similar chemical compositions and physical properties include those derived from the shells of the ivory nut palm, *Phytelephas macrocarpa*, from the seeds of the flame tree, *Delonix regia*, from the seeds of the tara plant, *Caesalpinia spinosa*, and from the seeds of the locust bean, *Ceratonia siliqua*.

Despite the plugging ability of the galactomannan gums, such gums are not widely used as fluid loss control agents in drilling muds and similar fluids. At the concentrations required for effective plugging, the gums produce highly viscous solutions which have an adverse effect on drilling rate. They are also readily adsorbed on clays and shales and are therefore difficult to maintain in the proper concentrations. Various methods for improving the gums have been suggested. One such method involves oxidation of the galactomannan by treating them with sodium peroxide in an alkaline medium. Experience has shown that this sometimes improves certain properties of the gums but does not permit their effective use as fluid loss control agents. It has been suggested that such materials be added to drilling muds and similar fluids in concentrations below those at which excessively high viscosities develop. At such concentrations, the gums have only a limited effect on fluid losses and serve primarily as flocculating agents.

It is therefore an object of the present invention to provide improved drilling muds, completion fluids, workover fluids and similar compositions containing galactomannan gums as fluid loss control agents. A further object is to provide low viscosity drilling muds and similar fluids containing a galactomannan derived from guar gum or a similar source in concentrations sufficient to reduce substantially fluid losses to subsurface strata. Another object is to provide drilling fluids containing a galactomannan gum which is not readily adsorbed upon clays normally present in such fluids during oil field drilling operations. Still other objects will become apparent as the invention is described in detail hereafter.

In accordance with the invention, it has now been found that many of the difficulties encountered in utilizing galactomannan gums as fluid loss control agents in drilling muds, completion fluids, workover fluids and similar compositions can be avoided by treating the gums to eliminate readily water-soluble constituents. Studies have shown that guar gum and similar materials normally hydrate in aqueous solution to yield components which vary widely in particle size. The smaller, more readily soluble particles, generally less than about 3 microns in size, are primarily responsible for the high viscosities obtained and also play an important role so far as adsorption on clays and shales is concerned. The larger, less soluble particles are excellent fluid loss control agents and produce only small increases in viscosity. By utilizing the relatively insoluble constituents of the gums, it is thus possible to produce drilling muds and similar fluids in which the galactomannan gums provide excellent control of fluid losses to subsurface strata without contributing undesirably high viscosities. This significantly extends the usefulness of guar gum and similar materials as fluid loss control agents in drilling muds and the like.

Guar gum and similar crude polysaccharides useful as fluid loss control agents in accordance with the invention can be treated in several different ways to avoid the high viscosities normally obtained when such materials are employed in drilling muds and similar liquids in concentrations sufficient to effectively reduce fluid losses. The simplest procedure is to first prepare a hydrosol containing the gum or polysaccharide and then remove or destroy the smaller hydrated particles primarily responsible for the viscosity of the hydrosol. An alternate procedure is to chemically treat the gum or polysaccharide to limit hydration and thus preclude the formation of high viscosity solutions. In either case, the result is a material which has excellent fluid loss properties but does not contribute significantly to the viscosity of the drilling mud or other fluid in which it is to be used.

Hydrosols containing guar gum or a similar polysaccharide can readily be prepared by adding the polysaccharide to water and permitting it to hydrate. The polysaccharides utilized are normally employed in the form of fine powders and may be added in concentrations up to about 2 percent by weight. At higher concentrations, the hydrosols may become too viscous to permit rapid separation of the components useful as fluid loss control agents from those primarily responsible for the high viscosities. The time required for hydration of the polysaccharide will depend primarily upon the particular polysaccharide selected, the pH of the water or other aqueous medium used, the ionic strength, the temperature and the type of agitation employed. A neutral pH, an elevated temperature and intense agitation generally accelerate hydration. In most instances it is preferred to permit the polysaccharide to hydrate for a period of from about 30 minutes to about 2 hours, but continuous hydration for a period extending up to about 24 hours may be desirable in some cases. The viscosity of the hydrated solution or hydrosol will generally range between about 100 centipoises and about 5,000 centipoises, depending on the polysaccharide employed and the extent to which hydration occurs. The use of hydrosols having viscosities between about 1,000 centipoises and about 3,000 centipoises is preferable, since this permits relatively rapid separation of the desired constituents of the hydrosol without handling unduly large volumes of solution.

Following preparation of the viscous hydrosol, the constituents useful for fluid loss control purposes can be separated from the liquid and more soluble constituents primarily responsible for the high viscosity by centrifuging the hydrosol. The amount of centrifugation required in a particular case depends upon the hydrosod viscosity and the size of the particles to be recovered. The use of sufficient centrifugal force to permit the recovery of particles having an average size greater than about 3 microns, preferably greater than about 5 microns, is generally satisfactory. Studies have shown that the high viscosities of drilling muds and similar fluids containing guar gum and related polysaccharides are largely due to the presence of particles having an average size considerably less than 3 microns. Centrifugation at about 20,000 to about 35,000 relative centrifugal force units for a period of from about 5 to about 30 minutes will usually permit such a separation without difficulty. A conventional centrifuge and related equipment may be employed to make the separation.

The relatively large hydrated particles separated from the hydrosol can be added directly to a drilling mud or other liquid in which a fluid loss control agent is required or may instead be redispersed in water or an aqueous solution and later added to the mud or other liquid. Guar gum and many other polysaccharides are not seriously affected by the presence of salts in moderate concentrations and can therefore be employed in both fresh water and brimes. Certain salts when present in high concentration may cause precipitation of some polysaccharides, however, and hence it is usually preferred to check the salt susceptibility of the material before using it in concentrated brime solutions. The hydrated particles may be added to drilling muds and similar fluids in concentrations ranging from about 0.005 percent by weight to about 1.0 percent by weight, based on the dry weight of the polysaccharide. Tests have shown that concentrations in the range between about 0.05 percent and about 0.5 percent by weight normally impart excellent fluid loss control properties to muds and similar fluids and hence concentrations within this latter range are generally preferred. If the particles are to be dispersed in water or a similar fluid and then added to a mud or the like, the concentration in the intermediate fluid will normally be considerably higher than that in the final fluid.

In lieu of centrifuging a hydrosol to recover relatively large particles useful for controlling fluid losses as described above, the hydrosol can be subjected to high shearing stresses for extended periods in order to break down the smaller, more readily soluble particles and produce a low viscosity material having good fluid loss control properties. One method for doing this is to subject a hydrosol having an initially high viscosity to intense agitation until the viscosity has been reduced to the desired level. This can be done in the laboratory by means of a Waring Blendor or similar device. Commercial mixing equipment may be used for preparing the material in larger quantities. An alternate method for creating the necessary shearing stresses is to pump the hydrosol through a conventional back-pressure regulator or similar device set to withstand pressures ranging from about 200 to about 500 lbs. per square inch. In either case, the shearing stresses generated result in the breakdown of the soluble particles primarily responsible for the high viscosity of the hydrosol without greatly affecting the ability of the larger particles to plug porous subsurface strata with which the material may later be contacted. The low viscosity fluid thus produced may then be added to a drilling mud or similar fluid in quantities sufficient to give the required concentration of the fluid loss control agent.

Still another procedure for preparing the fluid loss control agents useful in accordance with the invention involves the chemical treatment of guar gum or a similar polysaccharide to destroy the soluble components responsible for the high viscosity of solutions containing the polysaccharide. Tests have shown that extended heating of such a polysaccharide in the presence of caustic or a similar base results in a change in the structure of the smaller particles and a resultant reduction in viscosity. It is preferred to heat the gum in alkaline solution at a temperature in the range between about 100° F. and about 250° F. for a period of from about 30 minutes to about 4 hours. The treated material thus obtained can be employed as a fluid loss control agent without the viscosity problems normally encountered with guar gum and similar materials.

The improved fluid loss control agent of the invention may be employed in a variety of aqueous media used in contact with subsurface strata. Such media include drilling muds, completion fluids, workover fluids, coring fluids and the like. In some instances, where it is desired to kill a well temporarily for example, the fluid loss control agent may be used in water or brine without other materials being present. In most cases, however, other solids will be suspended in the media to which the fluid loss control agent is added. Materials which may be present in such compositions include weighting agents such as barium sulfate, amorphous silica and calcium carbonate; gel forming materials such as bentonite and Attapulgus clay, viscosity modifying agents such as sodium metaphosphate, quebracho and calcium lignosulfate; calcium treating agents such as lime, calcium sulfate and calcium acetate; emulsifiers such as petroleum sulfonate, tall oil soaps and sodium lignosulfate; mixing oils such as crude oil and diesel oil, thinners and the like. It will be understood that not all of these materials will normally be present in any one drilling mud or other composition and that the amount of any particular material present will be governed to a large extent by the other constituents in the composition and by the service for which the composition is intended.

The fluid loss control agents of the invention are similar to other polysaccharide products in that they are subject to bacterial attack and over extended periods of time may be degraded. It is therefore preferred to utilize the agents in conjunction with a small amount of formaldehyde, benzoic acid, sorbic acid, a chlorinated phenolic compound, or a similar bactericidal or bacteristatic preservative. Dichlorophene, hexachlorophene and similar chlorinated aromatic compounds are particularly effective for this purpose. The use of such a preservative extends the effectiveness of the fluid loss control agents and permits their storage for long periods of time. The preservative concentration employed will depend upon the particular agent selected. In general, concentrations between 0.001 percent and about 1.0 percent by weight, based on the fluid content of the system, are effective. In many short term operations employing a fluid loss control agent, however, the use of a preservative is unnecessary.

A typical drilling mud containing a fluid loss control agent of the invention may contain, for each barrel of water, about 4.2 gallons of diesel oil, about 10 lbs. of bentonite, about 2 lbs. of the polysaccharide fluid loss control agent and about 2 lbs. of a thinner or viscosity modifying agent. This particular drilling mud is a diesel oil emulsion mud. The fluid loss control agents are not limited to use in muds of this particular type, however, and may be employed with equal effectiveness in fresh water muds and salt water muds. Drilling muds, completion fluids, workover fluids and coring fluids generally have somewhat similar compositions but vary with respect to the concentrations in which the composition components are present. A variety of compositions in which the fluid loss control agents of the invention may be utilized to advantage will be apparent to those skilled in the art.

The effectiveness of the fluid loss control agents of the invention can best be seen by considering the results obtained in tests of such agents and by referring to the accompanying drawing which shows the fluid loss control properties of a number of the materials tested.

In the first of the tests, an aqueous colloidal solution was prepared by adding guar gum flour to water in a concentration of 1.2 lbs. per barrel. The guar flour utilized was a commercial product marketed as Lo Loss 100–D by the Stein-Hall Company of New York. It had a galactomannan content of about 80 percent by weight. The flour was incorporated in the water by adding it with high agitation and then slowly agitating the mixture overnight in order to assure complete hydration and maximum fluid loss control effectiveness as recommended by the manufacturer. The resultant colloidal solution or hydrosol had a viscosity of 20 centipoises as measured on the Brookfield LVT viscometer at 80° F. with a No. 1 spindle at 60 revolutions per minute. This solution was then filtered through a porous ceramic disc manufactured by the Selas Corporation of America, New York. The disc employed was 1 inch in diameter and 1/8 inch thick and had a 2 darcy permeability to water. The manufacturer's specifications indicated a maximum capillary radius of 22 microns, based upon bubbling pressure experiments. At the beginning of the run, the disc and the space below it were completely filled with distilled water in order to permit determination of the initial rate of fluid loss. The guar solution was placed on the upper side of the disc and allowed to filter through it under a pressure differential of 6 lbs. per square inch for a period of 30 minutes. The amount of filtrate produced was measured at half-minute intervals during the first minute of the test, at 1 minute intervals for the next 4 minutes, and at 5 minute intervals during the next 25 minutes. It was found that the disc plugged rather slowly during the initial portion of the test. A total of 17.25 milliliters of filtrate was collected during a 30 minute test.

Following the test of the guar flour as described above, a second test using only the relatively insoluble constituents of the flour was carried out. A portion of the hydrosol prepared for the earlier test was placed in a SS-3 Servall centrifugal separator and centrifuged at a speed of 16,000 revolutions per minute for a period of 20 minutes. At this speed, the centrifuge developed about 32,000 relative centrifugal force units. Measurements showed that about 90 percent of the hydrated solids recovered from the centrifuge consisted of particles greater than 3 microns in size. These particles were then redispersed in distilled water in the same concentration in which they were present in the original hydrosol. The solution containing the suspended particles had a viscosity of 2 centipoises, only one-tenth that of the original hydrosol. This solution was then filtered through a clean porous ceramic disc similar to that used in the earlier test. The procedure employed was the same as in the earlier test. The total amount of filtrate collected during the 30 minute test period was only 11.8 milliliters. The low viscosity solution containing the relatively insoluble particles was thus considerably more effective as a fluid loss control agent than the original hydrosol containing the entire guar gum flour.

A third test was then carried out using a sheared guar gum solution. A hydrosol containing guar gum flour in a concentration of 1.2 lbs. per barrel was first prepared by adding the flour to water and allowing it to hydrate as described above. This solution, as in the earlier case, had a viscosity of about 20 centipoises. The viscous solution was sheared by pumping it through a Grove Regulator Company Model 91–W back-pressure regulator set to hold a pressure of 400 lbs. per square inch. The solution was circulated through the regulator at a rate of 8 gallons per hour for a period of 16 hours. At the end of this period, measurements with the Brookfield viscometer showed that the solution had a viscosity of 2 centipoises. The shearing effect on the solution as it passed through the regulator had evidently broken down the guar gum particles responsible for the initial high viscosity. This solution was then filtered through a ceramic disc as described earlier to determine the effectiveness of the sheared material for fluid loss control purposes. The test showed a total fluid loss of 12.9 milliliters during the 30 minute test period. The shearing of the solution thus reduced the viscosity and at the same time improved its effectiveness for plugging porous media.

Another test was carried out using a chemically modified guar gum prepared by treating guar flour with a 25 percent solution of sodium hydroxide at a temperature of 150° F. for a period of 2 hours under a nitrogen blanket and then drying the product. The dried guar particles were incorporated into water in a concentration of 1.2 lbs. per barrel and allowed to hydrate as in the earlier test. The resultant hydrosol had a viscosity of 3.8 centipoises as measured at 80° F. with the Brookfield viscometer. This solution was filtered through a clean porous ceramic disc in the manner described previously. A total of 13.6 milliliters of filtrate passed through the disc in the 30 minute test period. Again a reduction in the viscosity of the solution resulted in better fluid loss control properties.

Still another test was carried out to demonstrate the use of guar gum particles in conjunction with a viscosity builder. The relatively insoluble constituents of guar gum flour were recovered by preparing a hydrosol and then centrifuging it as described earlier. The recovered solids from the guar gum were then added to water containing a polysaccharide produced by fermenting raw sugar with *Xanthomonas campestris* organisms. The fermentation was carried out at a temperature of about 75° F. under aerobic conditions for a period of about 72 hours. The fermentation medium employed contained 2.0 weight percent of raw sugar, 0.1 weight percent of dipotassium acid phosphate and 0.05 weight percent of "Stimuflav" a commercial bacterial nutrient. A thick viscous fermentate containing a polysaccharide was obtained at the end of the 72 hour period and was filtered to remove the bacterial cells. One part of this mixture was diluted with one part water containing the relatively insoluble guar gum constituents. The solution containing the guar gum constituents and the polysaccharide produced by *Xanthomonas campestris* had a viscosity of 127 centipoises as measured on the Fann V–G meter, a plastic viscosity of 3.5 centipoises and a yield value of 6.8 lbs. per hundred square feet. This solution was filtered through a clean porous ceramic disc of the type utilized in the earlier test. The filtrate was recovered and measured at intervals during a 30 minute period. A total of 7.4 milliliters of filtrate had been obtained at the end of the 30 minute period. The polysaccharide derived from raw sugar by the action of *Xanthomonas campestris* further improved the fluid loss control properties of the solution and produced a marked increase in viscosity. The modied guar gum or similar polymers can thus be employed in conjunction with other materials to produce solutions which have the desired viscosity characteristic and at the same time are characterized by extremely low fluid loss control properties.

The results obtained in the test described above are shown graphically in the attached drawing. It can be seen from the drawing that the use of guar flour resulted in a solution having a viscosity of 20 centipoises in a 30 minute fluid loss value of 17.25 milliliters. The solutions containing particles produced by shearing, centrifuging or chemically treating guar gum hydrosols all had viscosities between 2 and 3.8 centipoises and had fluid loss value ranging from 11.8 to about 13.6 centipoises. This clearly demonstrates that guar gum and similar galactomannans can be employed to effectively reduce the fluid loss control properties of aqueous liquids without materially increasing their viscosities. By utilizing such gums in conjunction with a viscosity builder such as the polysaccharide produced by *Xanthomonas campestris*, drilling muds and other fluids having any desired combination of viscosity and fluid loss control properties can readily be prepared.

A further advantage of the galactomannan treated in accordance with the invention is shown by the results of tests of a clay drilling mud. The mud contained, per barrel of water, about 4.2 gallons of diesel oil, about 10 lbs. of bentonite clay, about 1 lb. of a pregelatinized starch marketed as "Impermex" by the Baroid Division of National Lead Company, and about 2 lbs. of a lignitic thinner marketed as "Carbonox" by the Baroid Division of National Lead Company. This mud had an initial A.P.I. 30 minute fluid loss of 31 cc. After aging 96 hours at 160° F., it had an A.P.I. fluid loss of 32.9 cc. The addition of a modified guar gum produced by treating guar flour with a 25 percent caustic solution at 150° F. for about 2 hours as described earlier to the mud in a concentration of 2 lbs. per barrel reduced the initial A.P.I. 30 minutes fluid loss value to 9 cc. After aging the mud 96 hours at 160° F., the fluid loss had increased to only 12.4 cc. Conventional guar gum flour added to such a clay-containing mud in a 2 lbs. per barrel concentration produces very little change in the fluid loss properties of the mud because the gum acts as a flocculating agent and is rapidly adsorbed on the clay particles. The caustic treated gum showed no flocculating tendencies and resulted in much better fluid loss properties than could otherwise have been obtained.

What is claimed is:

1. An aqueous drilling fluid containing as a fluid loss control agent from about 0.005 to about 1.0 weight percent of a galactomannan gum composed primarily of hydrated particles in excess of about 3 microns in size, said particles being present in a concentration sufficient to substantially reduce the fluid loss value of said fluid and the particles less than about 3 microns in size responsible for the viscosity-building properties of said galactomannan gum having been substantially eliminated from said gum.

2. A fluid as defined by claim 1 wherein said galactomannan gum is guar gum.

3. A fluid as defined by claim 1 wherein said galactomannan gum is present in a concentration in the range between about 0.05 percent and about 0.5 percent by weight.

4. A fluid as defined by claim 1 wherein said galactomannan gum consists primarily of particles in excess of about 5 microns in size.

5. A method for forming a filter cake on an exposed subterranean formation surrounding a borehole which comprises contacting said formation from with said borehole with an aqueous galactomannan gum solution containing suspended gum particles in excess of about 3 microns in size in a concentration sufficient to substantially reduce the fluid loss value of said solution, particles less than about three microns in size responsible for the viscosity-building properties of the galactomannan gum having been substantially eliminated from said gum.

6. A method as defined by claim 5 wherein said galactomannan gum solution is a guar gum solution.

7. A method for reducing fluid losses to a subterranean formation surrounding a borehole which comprises preparing an aqueous liquid containing a modified guar gum produced by heating guar flour in the presence of sodium hydroxide at a temperature between about 100° F. and about 250° F. for a period of from about thirty minutes to about four hours, said modified guar gum being present in a concentration sufficient to reduce the fluid loss value of said aqueous liquid, and thereafter injecting said aqueous liquid into said borehole in contact with said formation.

References Cited by the Examiner

UNITED STATES PATENTS

| | | | |
|---|---|---|---|
| 2,483,936 | 10/1949 | Roberts | 252—8.5 |
| 2,553,485 | 5/1951 | Swanson | 260—209 |
| 2,854,407 | 9/1958 | Mallory | 252—8.5 |
| 2,908,597 | 10/1959 | Owen | 252—8.5 |
| 3,000,790 | 9/1961 | Jeanes et al. | 252—8.5 XR |

FOREIGN PATENTS 579,582   7/1959   Canada.

OTHER REFERENCES

Haug: Guar Mannogalactan Studies, article in TAPPI, vol. 36, No. 1, January 1953, pages 47 to 53.

JULIUS GREENWALD, *Primary Examiner.*

ALBERT T. MEYERS, *Examiner.*

H. B. GUYNN, *Assistant Examiner.*